United States Patent [19]
Chen

[11] Patent Number: 5,758,958
[45] Date of Patent: Jun. 2, 1998

[54] FOG SIGNAL LAMP

[76] Inventor: Chun-Liang Chen, No. 58, Alley 195, Lane 54, Fu-Shing Rd., Yung Kang City, Tainan Hsien, Taiwan

[21] Appl. No.: 732,857

[22] Filed: Oct. 15, 1996

[51] Int. Cl.⁶ ............................................. F21V 7/00
[52] U.S. Cl. .................... 362/307; 362/83.3; 362/311; 362/806
[58] Field of Search ..................... 362/61, 80, 82, 362/83.3, 307, 310, 311, 806

[56] References Cited

U.S. PATENT DOCUMENTS

| 4,439,817 | 3/1984 | Aton | 362/255 |
|---|---|---|---|
| 5,001,610 | 3/1991 | Otaka | 362/61 |
| 5,169,228 | 12/1992 | Breitzler | 362/293 |
| 5,467,259 | 11/1995 | Hume et al. | 362/307 |

Primary Examiner—Stephen F. Husar
Attorney, Agent, or Firm—Morton J. Rosenberg; David I. Klein; Jun Y. Lee

[57] ABSTRACT

The present invention provides a fog signal lamp, which comprises a bulb set, a reflector, a shade holder, a decorative frame, an ornamental ring, a lampshade and an enclosing cover. Wherein, a colorful transparent ornamental ring can be fixed in the decorative frame, and the decorative frame is mounted on the front end of the reflector, therein the connection of the ornamental ring and the decorative frame is in bayonet joint. When the fog signal lamp is turned on, the beam emitting from the bulb shining the reflector is refracted and spotlighted with the lampshade as a common head-lamp, meanwhile the transparent ornamental ring absorbs refracted light to create a colorful ring light as a fog signal lamp.

2 Claims, 4 Drawing Sheets

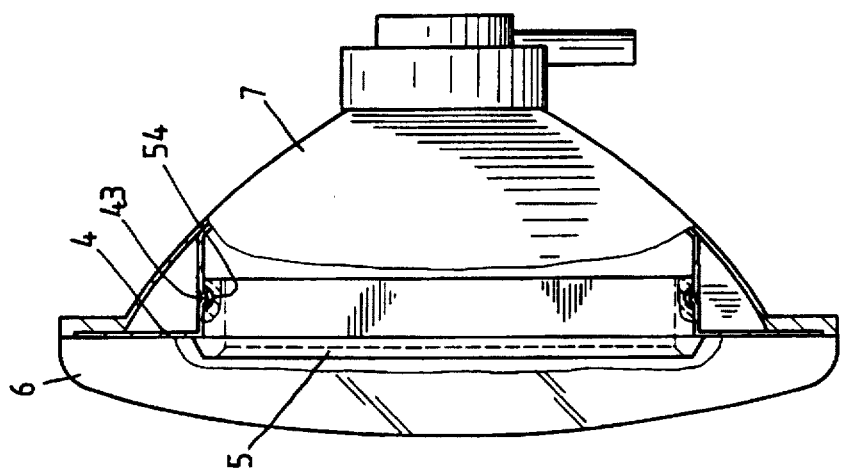

FOG SIGNAL LAMP

BACKGROUND OF THE INVENTION (1) Field of the Invention

The present invention relates to a fog signal lamp, and more particularly to a fog signal lamp utilizing a transparent ornamental ring with various colors to illuminate colorful ring prominently as lighting.

(2) Prior of Art

The conventional fog signal lamps are mostly covered with an opaque lampshade having different colors on the reflector to create a colorful fog signal lamp. This design can best be noticed at a bright day time. However, the colorful effect of the lamp will be negligent when at a dark place. Furthermore, the light bulb emits light on the reflector will blur the design and can hardly be noticed.

OBJECTS AND SUMMARY OF THE INVENTION

It is a primary object of the present invention to provide a fog signal lamp having a decorated effect to show an illuminating ring prominently. The property of the present invention includes a colorful transparent ornamental ring mounted in the inner portion of a decorative collar and the front end of a reflector. When the fog light is turned on, the light reflects from the reflector refracting into the inner portion of the ornamental ring forming a luminous ring to show the frame color of the ornamental ring prominently without affecting any function of the fog signal lamp emitting light at the same time. The ornamental rings has a decoration purpose regardless of the fog signal lamp is functioning or not, that makes the fog signal lamp is full of colors and attractive.

BRIEF DESCRIPTION OF THE DRAWINGS

FIG. 4 is a partial cross-section side view showing a second embodiment of the present invention;

DETAILED DESCRIPTION OF PREFERRED EMBODIMENTS

Figure 1:
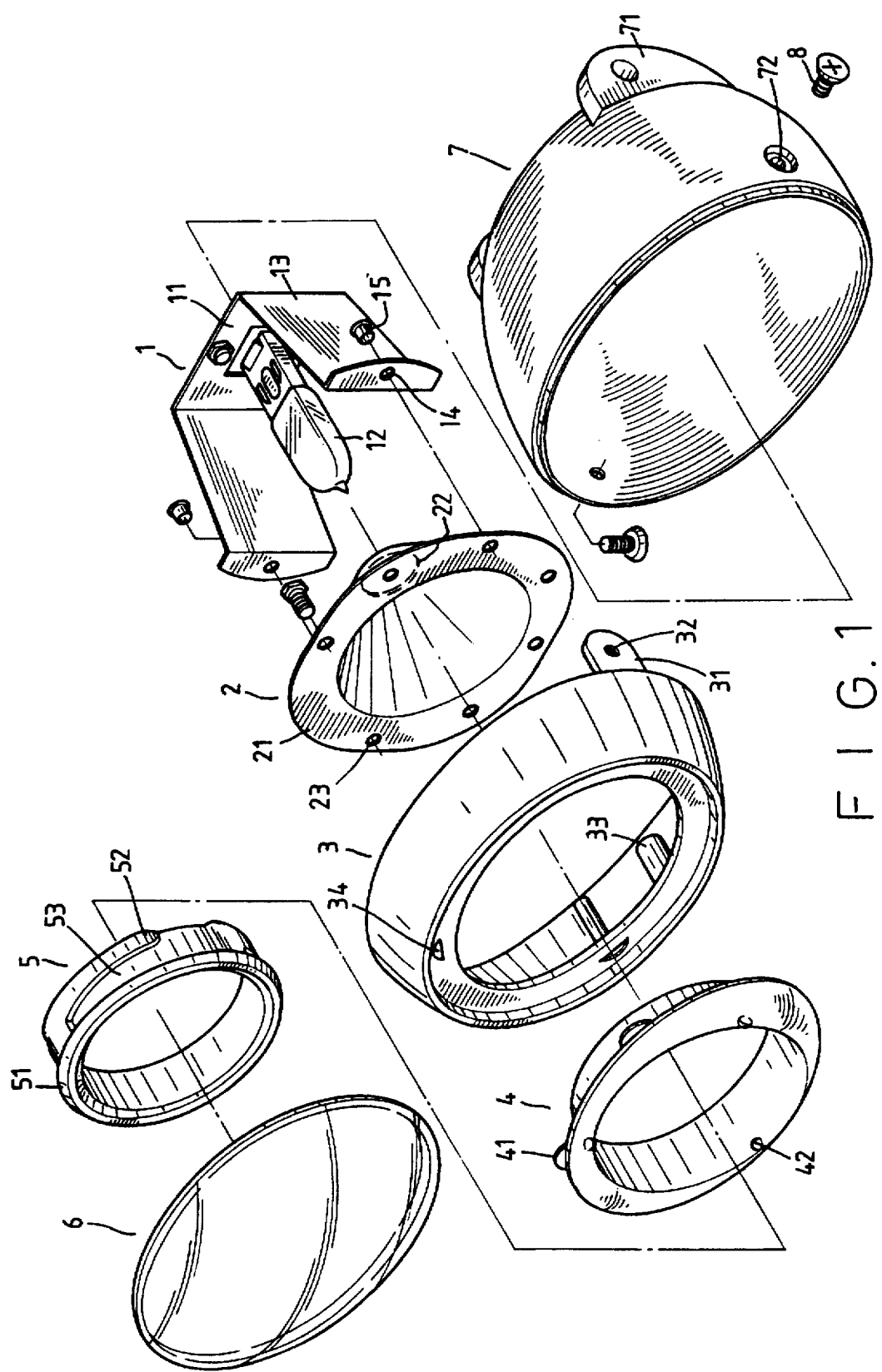
FIG. 1 is an exploded view of the present invention.

Referring to FIG. 1, the present invention comprises a bulb set 1, a reflector 2, a shade holder 3, a decorative collar 4, an ornamental ring 5 and a lampshade 6 sealed within an enclosing cover 7.

The bulb set 1 consists of a U-shaped bracket 11, a bulb 12 fixed on the center of the middle segment of the U-shaped bracket 11, in which the open ends of the U-shaped bracket 11 extend outwardly and horizontally forming to terminal legs 13 having a fixing hole 14 respective extreme ends for securing the reflector 2 thereon with bolts 15.

The reflector 2 is a bowl-shaped saddle which includes a flange 21 having several through-holes 23 equally spaced thereon, and an opening 22 formed on the center of the saddle for the bulb 12 to pass through.

The shade holder 3 has a hollow corn shaped body encasing the enclosing cover 7 by means of aligning the holes 32 on a pair of lugs 31 at respective sides to a pair of holes 72 on the enclosing cover 7 and secured with fasteners. The inner wall of the shade holder 3 is formed with a plurality of axial cylindrical projections 33 for concatenating the reflector 2 together. A plurality of indentations 34 are formed on the upper outer surface.

The decorative collar 4 is a hollow body, which comprises a plurality of lugs 41 projecting from the edge for inserting and fixing into the corresponding indentations 34 on the shade holder 3, and three projections 42 equally spaced along the inner wall thereof.

The ornamental ring 5 is a colorful transparent ring having a flange portion 51 at front end, and three beveled shoulders 52 equally spaced from each other forming three threaded heads on the rear outer wall and three ring grooves 53.

The lampshade 6 is a transparent shade cover which is able to cover on the shade holder 3 in socket-joint correspondingly.

The enclosing cover 7 is a hollow shield with a pair of arc lugs 71 extending from the rear end thereof for fastening on the body of a vehicle having two opposite holes 72 formed on the side wall of each lug 71 for fixing the shade holder 3 thereon by screws 8.

Figure 2:
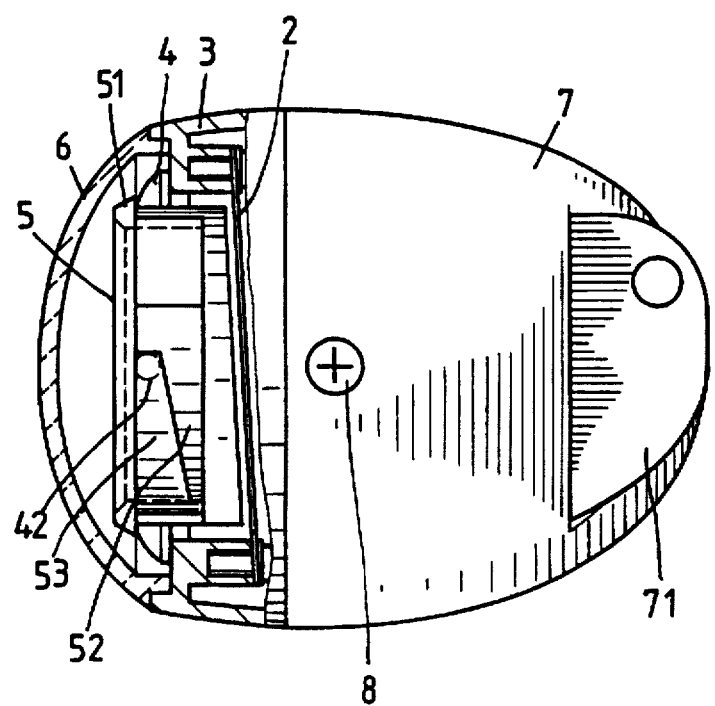
FIG. 2 is a partial cross-section view of the present invention.

In combining, referring to FIG. 2, lapping the flange 21 of the reflector 2 over the terminal legs 13 of the U-shaped bracket 11 of the bulb set 1 and fastening together with bolts 15 such that the bulb 12 passes through the center opening 22 of the reflector 2. Fixing the decorative collar 4 into the shade holder 3 by inserting the lugs 41 into the indentations 34 of the shade holder 3. Aligning the opening of the ring groove 53 of the ornamental ring 5 to the projections 42 on the inner wall of the decorative collar 4, and pushing and turning the ornamental ring 5 inwardly in an angle as a bayonet lock, in order to mount the ornamental ring 5 on bayonet joint. Placing the lampshade towards the shade holder 3 and securing together to complete the combination of the shade holder assembly. Finally the assembled reflector 2 is inserted into the shade holder 3 and inserting into the inner portion of the enclosing cover 7 and fastening with screws 8.

Referring to the Figures, the present invention can emit a clear and bright colored ring when the visibility is in good condition. When the fog signal lamp is turned on, the beam emits from the bulb shooting on the reflector will be reflected and spotlighted with the lampshade as a common head-lamp, meanwhile the transparent ornamental ring can absorb deflected light to give out a colored ring light as a fog signal lamp.

Figure 3:
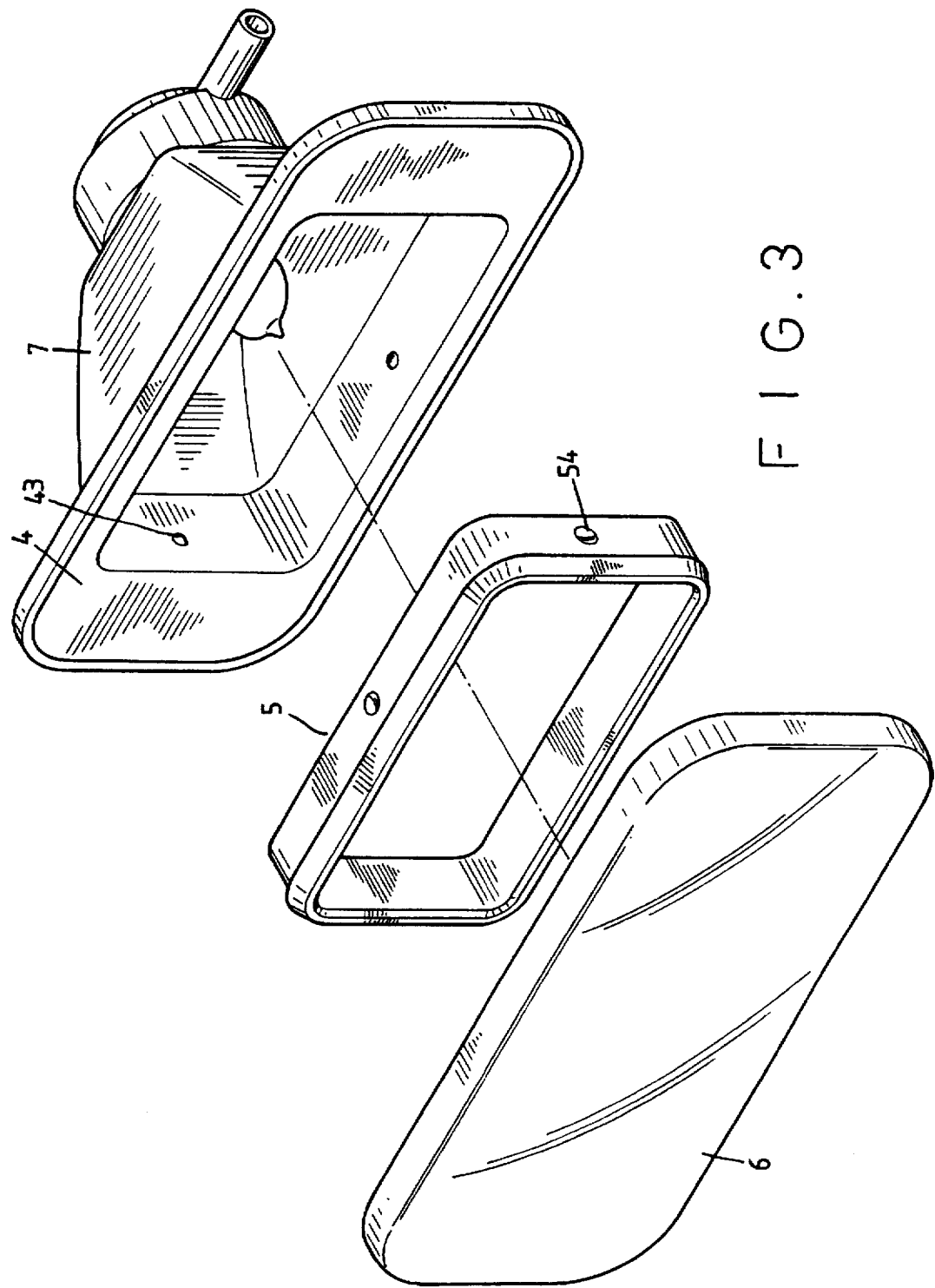
FIG. 3 is an exploded view showing the structure of a second embodiment.

On the other hand, the present invention can be applied with variety shapes or styles of the fog signal lamp, take a rectangle shape for instant, referring to FIG. 3.

The decorative frame 4 has four projections 43 on the four inner walls respectively, and the ornamental ring 5 has four corresponding indentations 54 for securing to the projections 43.

In assembling, the ornamental ring 5 is put into the decorative frame 4 so that the indentations 54 slide into the projections 43 which can be applied with glue on the contacting surface between the ornamental ring 5 and the decorative frame 4 for intensifying the fastening.

I claim:

1. A fog signal lamp, comprising:

a bracket having a middle segment and a pair of symmetrically positioned terminal legs, each of said legs being provided with a fixing hole at a respective distal end thereof;

a light source mounted to said middle segment of the bracket between said terminal legs;

a reflector having a bottom and a front edge, said reflector further including a central opening positioned at the bottom of the reflector, an annular flange surrounding the reflector at the front edge thereof, and a plurality of through holes substantially equi-distantly spaced apart circumferentially along the annular flange, said light source protruding through the central opening of the reflector and said distal ends of the terminal legs of the bracket engaging the annular flange of the reflector with the fixing holes being aligned with a pair of respective through holes of said plurality of through holes of the annular flange of the reflector for passage of fasteners therethrough;

an enclosing cover constituting a hollow shield having a rear portion and side walls extending from said rear portion and terminating in a front edge thereof, said enclosing cover having a pair of opposite holes being positioned at the side walls in proximity to the front edge thereof;

a shade holder including a circular hollow body having a lower edge and a pair of spaced apart lugs thereon, each of said lugs having a hole formed therethrough, said holes in the lugs being aligned with a respective one of said holes in the enclosing cover for passage of fasteners therethrough, said shade holder having a plurality of cylindrical projections extending axially along an inner surface of the circular hollow body for coupling to the flange of the reflector, said shade holder having a plurality of indentations being formed on an upper outer surface of the shade holder in circumferentially spaced apart relationship;

a decorative collar having a substantially cylindrical body with an annular edge member extending from an upper edge of said cylindrical body, said decorative collar having a plurality of lugs projecting from said annular edge member and engaging said indentations on the upper outer surface of the shade holder, said decorative collar having a plurality of projections equi-distantly spaced apart circumferentially along an inner surface of said cylindrical body of the decorative collar;

a ring member having a colorful transparent ring body with a flange at the front end thereof and a plurality of beveled shoulders substantially equi-distantly spaced apart along an outer surface of the ring body forming a plurality of threaded heads at the rear end of the ring body and adjacent grooves in said outer surface, the ring member being introduced into the cylindrical body of the decorative collar with the outer surface of the ring body of the ring member engaging the inner surface of the cylindrical body of the decorative collar, and with each of said plurality of projections on the inner surface of the cylindrical body of the decorative collar locked within a respective one of said grooves in said outer surface of the ring body of the ring member, thereby removably securing the ring member to the decorative collar, said ring member modifying a color of light from said light source passing therethrough; and a lampshade secured to the shade holder at the upper edge thereof over the ornamental ring, wherein a portion of light from said light source passes through said lampshade to form a spotlight and a portion of light from said light source passes through said ring member and said lampshade to form a ring-shaped fog light.

2. A fog signal lamp, comprising:

a hollow enclosure;

a reflector disposed in said enclosure and having an open front end and a substantially closed back end, said reflector having a centrally disposed opening formed through said back end thereof;

a light source disposed within said enclosure and extending through said central opening of said reflector;

a substantially transparent and colored ring member having a flange portion and a body portion extending from said flange portion, said body portion being disposed in juxtaposition with said open end of said reflector for providing an increased surface area portion for collecting light from said light source and transmitting said collected light through said body portion to said flange portion, said ring member modifying a color of said transmitted light; and, a transparent lampshade secured to said enclosure and overlaying said open end of said reflector and said flange portion of said ring member for passage therethrough of light from said light source to form a spotlight and light from said flange portion to form a ring-shaped fog light, said ring member providing an aesthetically pleasing color portion visible through said lampshade when said light source is de-energized.

* * * * *